United States Patent
Haugland

(10) Patent No.: US 7,518,949 B2
(45) Date of Patent: Apr. 14, 2009

(54) SHEAR WAVE VELOCITY DETERMINATION USING EVANESCENT SHEAR WAVE ARRIVALS

(75) Inventor: Samuel Mark Haugland, Houston, TX (US)

(73) Assignee: Smith International, Inc., Houston, TX (US)

( * ) Notice: Subject to any disclaimer, the term of this patent is extended or adjusted under 35 U.S.C. 154(b) by 96 days.

(21) Appl. No.: 11/145,441

(22) Filed: Jun. 3, 2005

(65) Prior Publication Data

US 2006/0285439 A1    Dec. 21, 2006

(51) Int. Cl.
*G01V 1/40* (2006.01)
*G01V 1/50* (2006.01)

(52) U.S. Cl. .............................. 367/31; 367/25; 367/35

(58) Field of Classification Search ................... 367/25, 367/31, 32; 702/18
See application file for complete search history.

(56) References Cited

U.S. PATENT DOCUMENTS

| 4,575,830 | A | * | 3/1986 | Ingram et al. ................. 367/31 |
| 4,701,891 | A | * | 10/1987 | Castagna et al. .............. 367/31 |
| 4,779,236 | A | * | 10/1988 | Sondergeld ................... 367/31 |
| 5,354,956 | A | * | 10/1994 | Orban et al. ................ 181/105 |
| 5,726,951 | A | | 3/1998 | Birchak et al. |

OTHER PUBLICATIONS

Schmitt, D. P. "Shear wave logging in elastic formations." J. Acoust. Soc. Am. 84 (6) Dec. 1988.*

Tsvankin, Ilya. "Properties of evanescent waves in anisotropic media."*

X. M. Tang, et al., "Shear-Velocity Measurements in the Logging-While Drilling Environment: Modeling and Field Evaluations," Petrophysics, vol. 44, No. 2 (Mar.-Apr. 2003), pp. 79-90.

G. L. Varsamis, et al, "LWD Shear Velocity Logging in Slow Formations Design Decisions and Case Histories," SPWLA 41st Annual Logging Symposium, Jun. 4-7, 2000, Paper O.

C. H. Cheng and M. N. Toksoz, "Elastic Wave Propagation in a Fluid-Filled Borehole and Synthetic Acoustic Logs," Geophysics, vol. 46, No. 7, Jul. 1981, pp. 1042-1053.

D. P. Schmitt, "Shear Wave Logging in Elastic Formations," J. Accoust. Soc. A., 84(6), Dec. 1988; pp. 2215-2229.

M. T. Taner, F. Koehler, and R. E. Sheriff, "Complex seismic trace analysis," Geophysics, vol. 44, No. 6 (Jun. 199); pp. 1041-1063.

C. H. Cheng and M. Nfi Toksoz, "Determination Of Shear Wave Velocities In "Slow" Formations," SPWLA 24th Annual Logging Symposium, Jun. 37-30, 1983, Paper V.

Georgios L. Varsamis, et al., "A New MWD Full Wave Dual Mode Sonic Tool Design And Case Histories," SPWLA 40th Annual Logging Symposium, May 30,-Jun. 3, 1999, Paper P.

(Continued)

*Primary Examiner*—Jack W. Keith
*Assistant Examiner*—Scott A Hughes

(57) ABSTRACT

A method for determining a shear wave velocity of a subterranean formation from a leaky shear wave arrival is disclosed. Standoff measurements are utilized to indicate the presence of leaky shear wave arrivals in the received waveforms. In one exemplary embodiment, leaky shear waves are indicated when the measured standoff distance is less than a predetermined threshold. The invention may provide for a direct determination of shear wave velocity in acoustically slow formations, thereby potentially improving accuracy as compared to prior art estimation techniques. The invention may further provide for improved power efficiency.

18 Claims, 3 Drawing Sheets

OTHER PUBLICATIONS

F. EL-Wazeer, et al.; "Applications For A Full Wave Sonic LWD Tool in the Middle East," Society of Petroleum Engineers 13th Middle East Oil Show & Conference, Apr. 5-8, 2003, SPE 81474.

Jennifer Market, et al., "Proceeding and Quality Control of LWD Dipole Sonic Measurements," SPWLA 43rd Annual Logging Symposium, Jun. 2-5, 2002, Paper PP.

Chaur-Jian Hsu and Kikash K. Sinha, "Mandrel effects on the dipole flexural mode in a borehole," J. Accoust. Soc. Am. 104(4), Oct. 1998, pp. 2025-2039.

Haugland, S. M., "Frequency Dispersion Effects on LWD Shear Sonic Measurements in Acoustically Sloe Environments," SPE Paper 90505, SPE Annual Technical Conference and Exhibition, Houston, Texas, Sep. 26-29, 2004.

Haugland, S. M., "Analytical Solution for an Eccentric Mandrel in a Fluid-filled Borehole: The Acoustic Case," SEG International Exhibition and 74th Annual Meeting, Denver, CO, Oct. 10-15, 2004.

Haugland, S. M., "Mandrel Eccentricity Effects on Acoustic Borehole-Guided Waves," SEG International Exhibition and 74th Annual Meeting, Denver, CO, Oct. 10-15, 2004.

Boonen, P. and Yogeswaren, E., "A Dual Frequency LWD Sonic Tool Expands Exhibiting Unipolar Transmitter Technology to Supply Shear Wave Data in Soft Formations," SPWLA 45th Annual Logging Symposium, Jun. 6-9 2004, Noordwijk, Netherlands, Paper X.

Huang, X., "Effects of Tool Positions on Borehole Acoustic Measurements: A Stretched Grid Finite Difference Approach," Dissertation, MIT, 2003.

Gardner, G. H. F., et al., "Formation Velocity and Density—The Diagnostic Basics for Stratigraphic Traps," Geographics, vol. 39, No. 6, Dec. 1974, pp. 770-780.

Winbow, Graham. A., "A theoretical study of acoustic-S-wave and P-wave velocity logging with conventional and dipole sources in soft formations," *Geophysics*, vol. 53, No. 10, Oct. 1988, pp. 1334-1342.

* cited by examiner

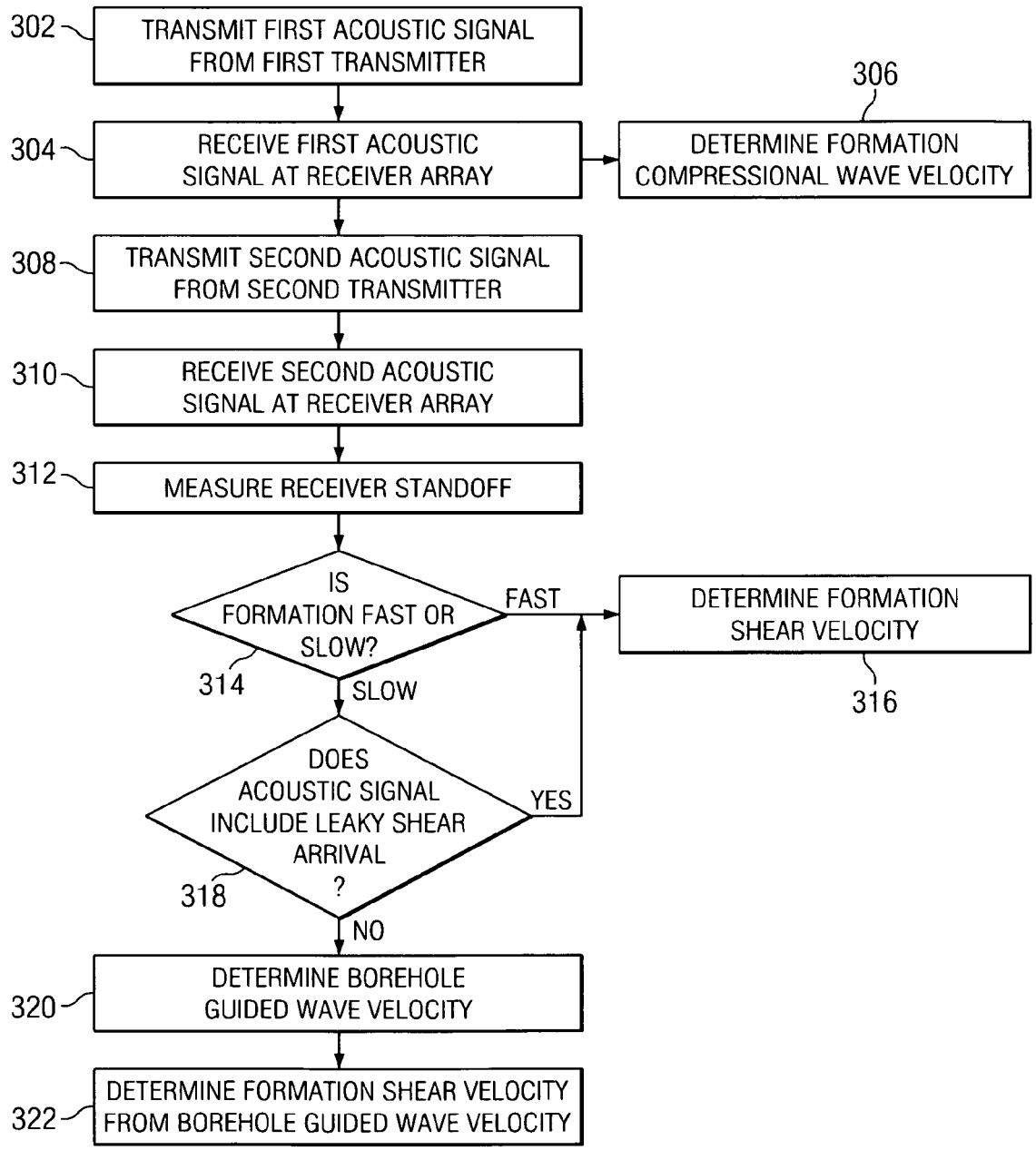

SHEAR WAVE VELOCITY DETERMINATION USING EVANESCENT SHEAR WAVE ARRIVALS

FIELD OF THE INVENTION

The present invention relates generally to acoustic logging while drilling of subterranean formations. More particularly, this invention relates to a method for determining a shear wave velocity of subterranean formations using leaky (evanescent) shear wave arrivals, such as might be advantageous in analysis of acoustically slow earth formations.

BACKGROUND OF THE INVENTION

The use of acoustic (e.g., audible and/or ultrasonic) measurement systems in prior art downhole applications, such as logging while drilling (LWD) and wireline logging applications is well known. Such acoustic measurement systems are utilized in a variety of downhole applications including, for example, borehole caliper measurements, measurement of drilling fluid properties, and the determination of various physical properties of a formation. In one application, acoustic waveforms may be generated at one or more transmitters deployed in the borehole. The acoustic responses may then be received at an array of longitudinally spaced receivers deployed in the borehole. Acoustic logging in this manner provides an important set of borehole data and is commonly used in both LWD and wireline applications to determine compressional and shear wave velocities (also referred to as slowness) of a formation.

It will be appreciated that the terms slowness and velocity are often used interchangeably in the art. They will likewise be used interchangeably herein with the understanding that they are inversely related to one another and that the measurement of either may be converted to the other by simple mathematical calculations. Additionally, as used in the art, there is not always a clear distinction between the terms LWD and MWD. Generally speaking MWD typically refers to measurements taken for the purpose of drilling the well (e.g., navigation) whereas LWD typically refers to measurements taken for the purpose of analysis of the formation and surrounding borehole conditions. Nevertheless, these terms are herein used synonymously and interchangeably.

Procedures for determining compressional and shear wave velocities are known in the prior art. In so-called "fast" formations, in which the shear wave velocity in the formation is greater than a speed of sound in the drilling fluid (drilling mud), the compressional and shear wave velocities may be directly determined from the received waveforms by well established techniques, such as semblance or phase velocity algorithms. However, in so-called "slow" formations, in which the shear wave velocity of the formation is less than the compressional wave velocity of the drilling fluid, direct determination of the shear wave velocity is typically not possible since the shear waves in the formation do not generally refract back into the borehole. Nevertheless, the shear wave velocity remains an important parameter and its determination is desirable.

As such, indirect methodologies have been developed to estimate shear wave velocity in acoustically slow formations. For example, the phase velocity of guided borehole modes, such as Stoneley (monopole), flexural (dipole), and screw (quadrupole) waves may be measured and utilized to estimate a formation shear velocity via known dispersion correction algorithms. The borehole wave velocities are known to depend not only on the formation shear velocity but also on mandrel properties (e.g., modulus) and eccentricity, drilling fluid density and velocity, borehole diameter, frequency, and formation density and compressional velocity. While such dispersion corrections have been successfully utilized in certain applications, in practice, one or more of the above mentioned properties are often not known with a high degree of accuracy, which reduces the accuracy of an estimate of the formation shear velocity. Moreover, properly identifying the detected borehole wave mode (e.g., Stoneley, flexural, or screw waves) can be problematic and misidentification of that mode tends to introduce further errors into the estimated formation shear velocity.

Other indirect methodologies for determining the formation shear velocity in acoustically slow formations typically include transmitting and/or sensing relatively pure borehole guided modes (e.g., Stoneley, flexural, and screw waves). For example, in conventional wireline logging applications, broad bandwidth, dipole logging tools were developed to produce an estimate of shear wave velocity in acoustically slow formations. Dipole (flexural) acoustic waves are known to asymptotically approach the formation shear wave velocity at low frequencies (e.g., from about 1 to about 3 kHz). Thus, in conventional wireline acoustic logging applications, the formation shear wave velocity may be determined from the low frequency portion of the dipole waveform. However, such dipole logging techniques are not typically suitable for LWD applications owing to potentially significant tool wave interference. In wireline applications, tool waves may be reduced via various tool configurations, such as slotted sleeves, isolation joints, and flexible tool structures. In LWD, tool waves tend to be carried by the comparatively stiff tool body, which is essentially the drill string, and thus tend not to be easily mitigated. Additionally, the presence of the drill string in the borehole and tool eccentricity in the borehole tends to alter the propagation modes of the acoustic energy, making it particularly difficult to transmit pure dipole waves. Further, drill bit noise tends to significantly reduce the signal to noise ratio in the low frequency range of interest. As such, deriving formation shear wave velocities from LWD data is not nearly as straightforward as in wireline applications.

In LWD applications there seems to be a trend in the art towards using broadband quadrupole (screw) waveforms (see, for example, Tang, et al., in *Petrophysics*, vol. 44, pgs. 79-90, 2003). Such quadrupole waveforms have been shown, for some tool configurations, to have a cut-off frequency below which tool wave propagation is substantially eliminated. It is thus apparent in the prior art that the use of quadrupole acoustic signals may be advantageous for determining shear wave velocities in LWD applications. However, the use of quadrupole waveforms tends to introduce other potential difficulties. For example, generating and receiving a relatively pure quadrupole acoustic signal typically requires complex segmented transmitters and receivers. Such transmitters and receivers typically further require highly precise phasing (timing) of the various segments to produce relatively pure quadrupole acoustic signals and to suppress other modes (e.g., monopole and dipole). The difficulty in generating such acoustic signals may be further exacerbated by tool eccentricity in the borehole (e.g., in deviated wells where the tool often lies on or near the low side of the borehole).

Therefore, there exists a need for improved methods for determining a shear wave velocity of a subterranean formation that address one or more of the shortcomings described above. Such methods may, for example, be advantageous in analysis of acoustically slow formations. In particular, it will be appreciated that a direct method that does not depend on dispersion corrections (or other estimation techniques) would be advantageous in that it provides for independent determination of the shear wave velocity and may therefore increase accuracy. Furthermore, a method that is not dependent on isolating dipole or quadrupole waveforms (for example), in the transmission or reception thereof, would also be advantageous, since many of the above stated disadvantages would be obviated.

SUMMARY OF THE INVENTION

The present invention addresses one or more of the above-described drawbacks of the prior art. Aspects of this invention include a method for determining a shear wave velocity (inversely related to slowness) of an acoustically slow formation from a leaky shear wave arrival (also referred to herein as an evanescent shear wave arrival). The shear wave velocity may be advantageously determined, for example, using conventional semblance and/or phase velocity techniques. Standoff measurements are utilized to indicate the presence of leaky shear wave arrivals in the received waveforms. In one exemplary embodiment, leaky shear waves are indicated when the measured standoff distance is less than a predetermined threshold. In the absence of leaky shear wave arrivals, shear wave velocity may be estimated from borehole guided wave arrivals using conventional dispersion algorithms.

Exemplary embodiments of the present invention may advantageously provide several technical advantages. For example, exemplary embodiments of this invention provide for a direct determination of shear wave velocity in acoustically slow formations, thereby potentially improving accuracy as compared to prior art estimation techniques. Moreover, exemplary embodiments of this invention are well suited for determining shear wave velocity when the logging tool is eccentered in the borehole. Additionally, exemplary methods of this invention may utilize multi-pole acoustic transmitters and receivers and do not require any techniques (such as filtering or interference) to isolate, suppress or enhance any particular waveform modes. As such this invention tends to obviate the need for the complex transmitters and receivers of the prior art.

Moreover, exemplary embodiments of this invention may reduce the number of transmitter firings required to acoustically log a formation as compared to prior art techniques, thereby conserving power. Such exemplary embodiments may also reduce the rate of data acquisition, thereby enabling a downhole tool to acquire data for a longer period of time before its memory banks are filled.

In one aspect the present invention includes a method for determining a shear wave velocity of a subterranean formation. The method includes deploying a downhole tool in a borehole, the downhole tool including at least one acoustic transmitter located at a first longitudinal position in the borehole and at least one acoustic receiver located at a second longitudinal position in the borehole. The method further includes propagating an acoustic signal in the borehole using the acoustic transmitter and receiving an acoustic waveform from the acoustic signal at the acoustic receiver. The method still further includes measuring a standoff distance between an outer surface of the downhole tool and the subterranean formation, evaluating the standoff distance to indicate a presence of leaky shear wave arrivals in the received waveform, and processing the leaky shear wave arrival to determine the shear wave velocity of the subterranean formation.

In another aspect, this invention includes a method for sonic logging a subterranean formation. The method includes deploying a downhole tool in a borehole, the downhole tool including at least one acoustic transmitter located at a first longitudinal position in the borehole and at least one acoustic receiver located at a second longitudinal position in the borehole. The method further includes measuring a standoff distance between an outer surface of the downhole tool and the subterranean formation and evaluating the standoff distance to control at least one of the group consisting of: (i) propagating an acoustic signal in the borehole using the acoustic transmitter and (ii) recording an acoustic waveform received at the acoustic receiver. Exemplary embodiments of the invention may further include processing the recorded acoustic waveform recorded to determine a speed of sound in the formation.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 depicts a flowchart of another exemplary method embodiment of this invention.

DETAILED DESCRIPTION

Figure 1:
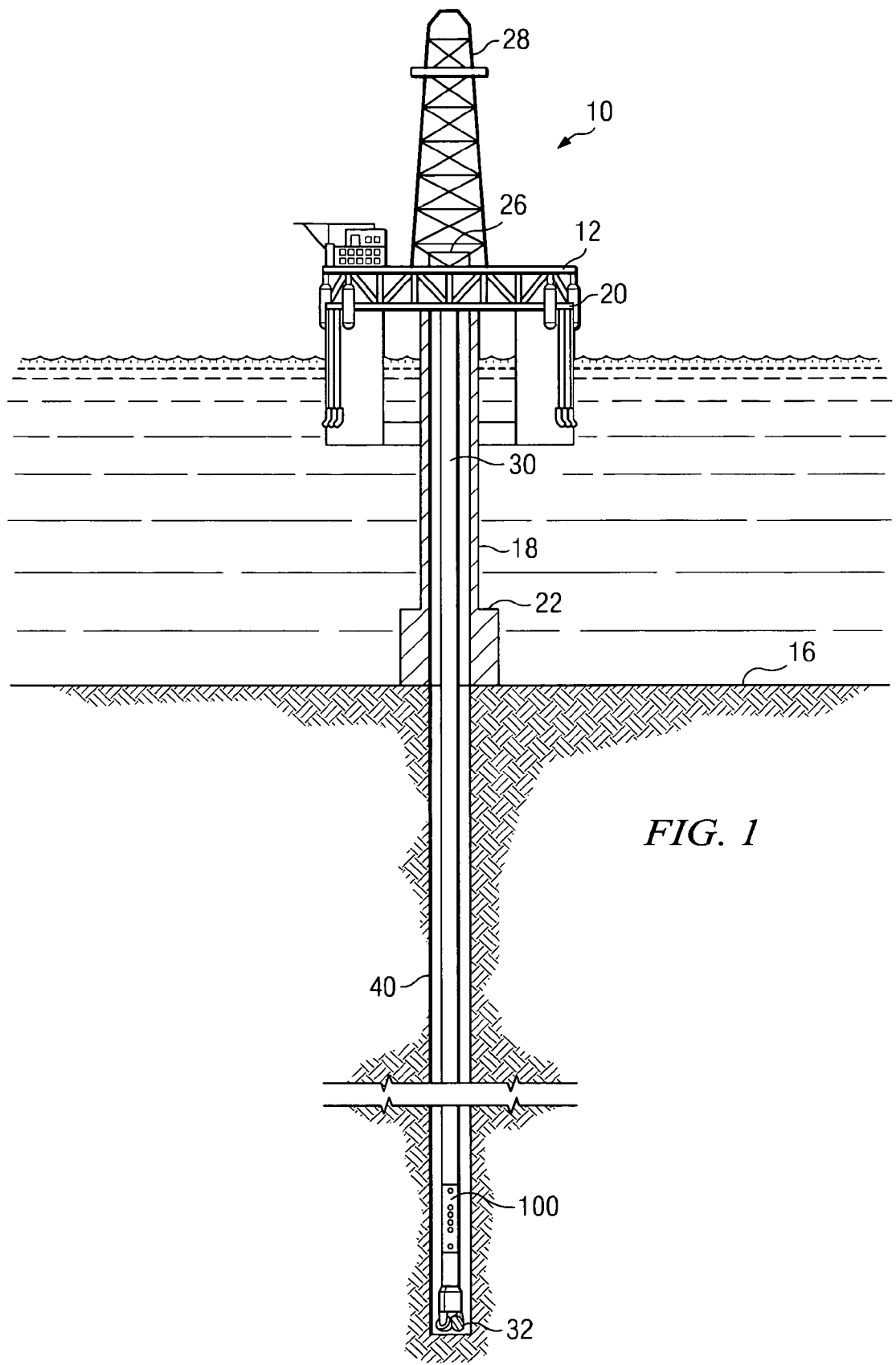
FIG. 1 is a schematic representation of an offshore oil and/or gas drilling platform utilizing an exemplary embodiment of the present invention.

FIG. 1 schematically illustrates one exemplary embodiment of an acoustic logging tool 100 according to this invention in use in an offshore oil or gas drilling assembly, generally denoted 10. In FIG. 1, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick 26 and a hoisting apparatus 28 for raising and lowering the drill string 30, which, as shown, extends into borehole 40 and includes a drill bit 32 and an acoustic logging tool 100. In the embodiment shown, and described in more detail with respect to FIG. 2, the acoustic logging tool 100 includes first and second transmitters 120 and 130 deployed about an array of longitudinally spaced receivers 140. Drill string 30 on FIG. 1 may optionally further include another logging tool 200 including at least one standoff sensor (not shown) deployed thereon. Drill string 30 may still further include a downhole drill motor, a mud pulse telemetry system, and one or more other logging tools, for example, including nuclear and/or electrical sensors, for sensing downhole characteristics of the borehole and the surrounding formation.

It will be understood by those of ordinary skill in the art that the deployment illustrated on FIG. 1 is merely exemplary for purposes of describing the invention set forth herein. It will be further understood that acoustic logging tool 100 of the present invention is not limited to use with a semisubmersible platform 12 as illustrated on FIG. 1. Logging tool 100 is equally well suited for use with any kind of subterranean drilling operation, either offshore or onshore.

Figure 2:
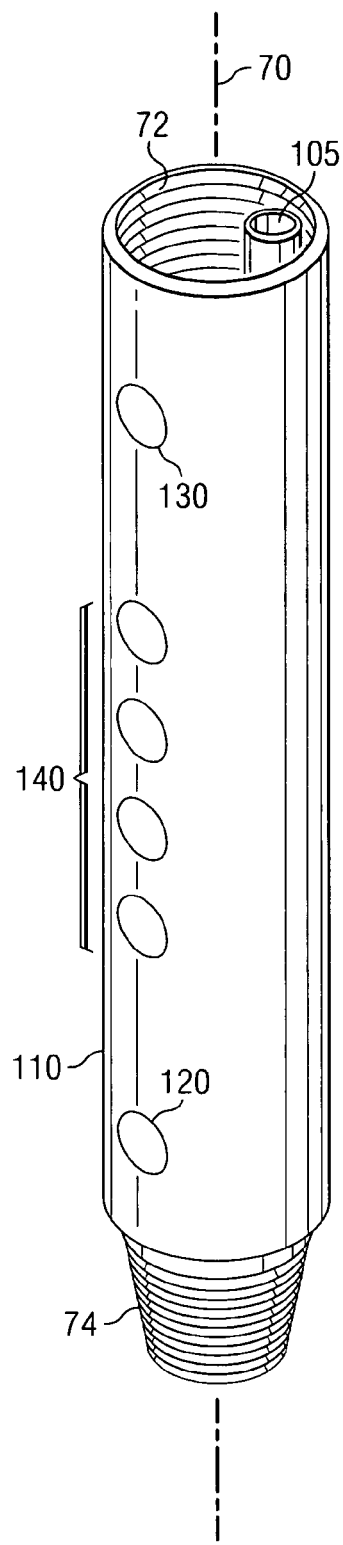
FIG. 2 depicts one exemplary MWD tool suitable for use in exemplary methods of this invention.

Referring now to FIG. 2, one exemplary embodiment of an acoustic logging tool 100 useful in conjunction with exemplary methods of the present invention is illustrated in perspective view. In FIG. 2, acoustic logging tool 100 is typically a substantially cylindrical tool, being largely symmetrical about cylindrical axis 70 (also referred to herein as a longitudinal axis). Acoustic logging tool 100 includes a substantially cylindrical tool collar 110 configured for coupling to a drill string (e.g., drill string 30 in FIG. 1) and therefore typically, but not necessarily, includes threaded end portions 72 and 74 for coupling to the drill string. Through pipe 105 provides a conduit for the flow of drilling fluid downhole, for example, to a drill bit assembly (e.g., drill bit 32 in FIG. 1). Acoustic logging tool 100 includes at least one, and preferably two (as shown) acoustic transmitters 120, 130 and an array of longitudinally spaced receivers 140 deployed thereon. It will be appreciated that while the embodiment shown includes two transmitters 120, 130 and a receiver array having four receivers 140, that this invention is not limited to any particular number of transmitters and receivers. It will also be appreciated that this invention is not limited to any particular relative azimuthal positioning of the transmitter(s) and receiver(s) on the tool 100.

In one exemplary embodiment of acoustic logging tool 100, one or more of the receivers 140 are configured to make acoustic standoff measurements (in addition to receiving acoustic energy from transmitters 120, 130). Such standoff measurements typically include transmitting an ultrasonic pulse into the drilling fluid and receiving the portion of the ultrasonic energy that is reflected back to the receiver 140 from the drilling fluid borehole wall interface. The standoff distance is then typically determined from the time delay between transmission and reception of the ultrasonic energy. The receiver 140 is typically configured to make the standoff measurements substantially simultaneously while receiving acoustic energy from the transmitters 120, 130. It will be appreciated by those of ordinary skill in the art, that acoustic signals utilized for the purpose of determining formation acoustic velocities are typically in the audible range (e.g., less than about 20 kHz) while acoustic signals utilized for making standoff measurements are typically in the ultrasonic range (e.g., greater than about 200 kHz). Thus, it will be understood that simultaneous standoff measurements and formation velocity measurements do not typically interfere with one another.

Although not shown in FIG. 2, it will be appreciated that acoustic logging tool 100 typically includes an electronic controller. Such a controller typically includes conventional electrical drive voltage electronics (e.g., a high voltage power supply) for applying waveforms to transmitters 120 and 130 and to the receiver 140 configured to make the standoff measurements. The controller typically also includes receiving electronics, such as a variable gain amplifier for amplifying the relatively weak return signal (as compared to the transmitted signal). The receiving electronics may also include various filters (e.g., pass band filters), rectifiers, multiplexers, and other circuit components for processing the return signal. For example, the receiving electronics may include multiple pass band filters for selecting appropriate frequency bands, in particular for the receiver 140 configured to make standoff measurements.

A suitable controller typically further includes a programmable processor, such as a microprocessor or a microcontroller, and may also include processor-readable or computer-readable program code embodying logic, including instructions for controlling the function of the acoustic transmitters 120, 130 and receivers 140. A suitable controller may also optionally include other controllable components, such as sensors, data storage devices, power supplies, timers, and the like. The controller may also be disposed to be in electronic communication with various sensors and/or probes for monitoring physical parameters of the borehole, such as a gamma ray sensor, a depth detection sensor, or an accelerometer, gyro or magnetometer to detect azimuth and inclination. The controller may also optionally communicate with other instruments in the drill string, such as telemetry systems that communicate with the surface. The controller may further optionally include volatile or non-volatile memory or a data storage device. The artisan of ordinary skill will readily recognize that the controller may be disposed elsewhere in the drill string (e.g., in another LWD tool or sub).

Figure 3:
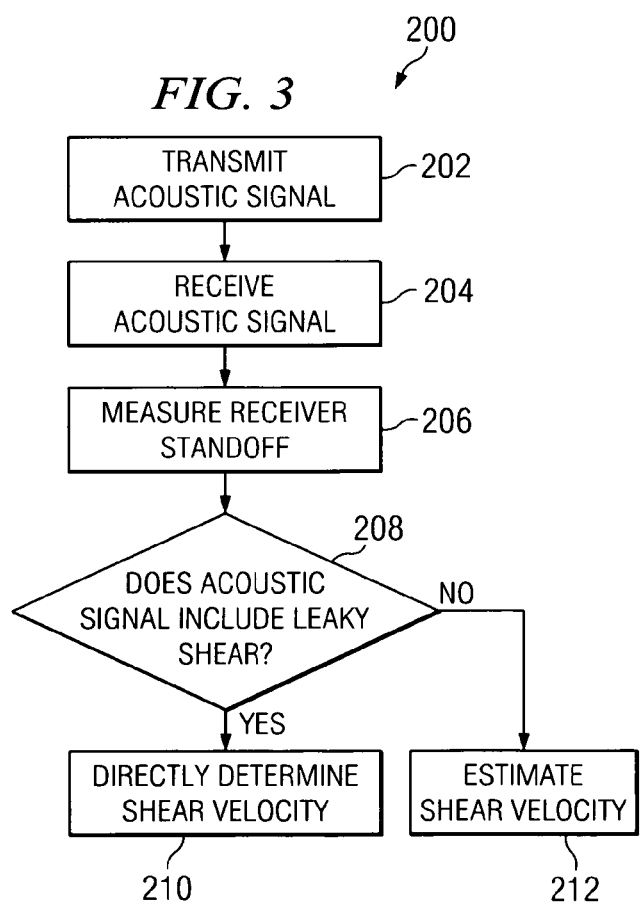
FIG. 3 depicts a flowchart of one exemplary method embodiment of this invention.

With reference now to FIG. 3, a flowchart 200 of one exemplary method according to this invention for determining a shear wave velocity is illustrated. Briefly, at 202 an acoustic transmitter, such as transmitter 120 on FIG. 2, is fired thereby propagating an acoustic pressure pulse into a borehole. The waveform is received at 204 by one or more longitudinally spaced acoustic receivers, such as receiver(s) 140 on FIG. 2. At 206, a standoff distance between the acoustic receivers 140 and the borehole wall is measured. As described above, such a standoff distance is typically measured by one of the receivers 140. However, the standoff distance may equivalently be measured, for example, by another LWD tool deployed in the drill string, such as the Density Neutron Standoff Caliper Multilink (DNSCM™) tool available from Pathfinder Energy Services, Houston, Tex. It will be understood that in such an arrangement the standoff sensor(s) are typically circumferentially (azimuthally) aligned with the receivers 140. At 208 the measured standoff distance is utilized to determine whether or not leaky shear wave arrivals (also referred to herein as evanescent shear wave arrivals) are present in the waveform received at 204. For example, in one exemplary embodiment, the measured standoff distance may be compared to a predetermined standoff threshold. In such an embodiment, the presence of leaky shear wave arrivals is indicated when the measured standoff distance is less than the threshold. When leaky shear wave arrivals are present the formation shear velocity may be determined at 210 as described in more detail below. In the absence of a leaky shear wave arrival, the shear velocity may be estimated, for example, via a dispersion correction at 212 as also described in more detail below.

As described above in the Background section of this disclosure, prior art techniques make use of both shear waves and borehole guided waves to determine an acoustic shear wave velocity of a subterranean formation. In acoustically fast formations, shear waves traveling in the formation tend to refract back into the borehole and may be utilized to directly determine the shear wave velocity (e.g., via known semblance or phase velocity techniques). In acoustically slow formations shear waves traveling in the formation tend not to refract into the borehole. Therefore, in such applications, borehole guided wave arrivals are utilized instead to indirectly estimate a shear wave velocity (e.g., via known dispersion correction techniques). In contrast to the prior art, the present invention makes use of leaky shear waves (evanescent shear waves) to determine an acoustic shear velocity of an acoustically slow formation. Such leaky shear waves may be thought of in one sense as a direct shear wave arrival and thus may be utilized at 210 to directly determine the shear velocity in the same manner as in acoustically fast formations.

Evanescent waves (and/or fields) are known in acoustic and electromagnetic applications and may be thought of as waves that extend into a region where the boundary conditions prevent it from propagating. The amplitude of such evanescent waves typically decreases exponentially with increasing distance from the boundary. For example, in the case of a borehole in an acoustically slow formation, the amplitude of the leaky shear waves tends to decrease exponentially as the distance from the borehole wall increases. Stated another way, conditions for the measurement of leaky shear wave arrivals may be favorable when the acoustic distance between a sensor (such as receivers 140 in FIG. 2) and the borehole wall is sufficiently small. For the purposes of this disclosure acoustic distance may be thought of as the ratio of the physical distance to the wavelength of the acoustic signal. It will therefore be appreciated that the amplitude of leaky shear waves tends to increase with decreasing frequency and with decreasing distance between the acoustic receivers and the borehole wall.

One aspect of the present invention is the realization that standoff measurements (that measure the physical distance between a receiver and the borehole wall) may be utilized (e.g., at 208 in FIG. 3) to identify leaky shear wave arrivals in acoustic LWD applications and that such leaky shear arrivals may be utilized to directly determine formation shear velocity in acoustically slow formations (e.g., at 210 in FIG. 3). For example, in one exemplary embodiment, a measured standoff distance may be compared with a threshold. When the standoff distance is less than the threshold, leaky shear waves may be discernable above background noise and may be utilized to directly determine the formation shear velocity. It will be appreciated that substantially any suitable threshold may be utilized. It will also be appreciated that a suitable threshold may depend on many factors, including, for example, drilling noise, acoustic frequency, borehole diameter and shape, and various physical properties of the formation and drilling fluid.

As stated above, when leaky shear wave arrivals are present in the received waveform (e.g., when the standoff distance is less than a predetermined threshold), the acoustic shear velocity of the formation may be determined directly from the leaky shear wave arrivals, for example, using known semblance or phase velocity techniques. In the absence of a leaky shear wave arrival (e.g., when the standoff distance is greater than the predetermined threshold), the acoustic shear velocity of the formation may be estimated from the velocity of one or more borehole guided waves. Such velocities are typically determined from borehole guided wave arrivals in the received waveforms, for example, via known semblance or phase velocity techniques. The formation shear velocity may then be estimated, for example, by processing a mathematical model that relates theoretical formation shear wave velocities to theoretical borehole guided wave velocities. Derivation of such theoretical models may be accomplished by solving appropriate wave equations, for example, for a cylindrical pipe (or rod) deployed in an infinite fluid filled cylinder (borehole). It will be appreciated that various mathematical models have been published in the prior art by several authors, including, for example, Cheng and Toksöz (in Geophysics, vol. 46(7), p. 1042-1053, 1981) and Schmidt (in Journal of the Acoustic Society of America, vol. 84(6), p. 2215-2229, 1988). Artisans of ordinary skill in this art will likewise be readily able to derive and compute solutions to such mathematical models.

As described above, the present invention provides several technical advantages over the prior art. This invention is particularly advantageous in applications in which an LWD tool is eccentered in a borehole. Prior art dispersion correction methods for determining shear wave velocity in acoustically slow formations typically assume that the LWD tool is centered in the borehole. Such techniques, therefore, tend to be prone to error when the tool becomes eccentered, since such eccentering effects both the borehole guided wave velocities and the favored harmonic modes of borehole wave guided propagation. It will be appreciated, however, that the present invention is distinct from and advantageous over the prior art in that it tends to make use of tool eccentricity in the borehole. As an eccentered tool rotates in the borehole, the standoff distance between the sensors and the borehole wall increases and decreases periodically with time. In those regions of the borehole in which the standoff distance is relatively small (as compared to the standoff distance for a centered too), the likelihood of detecting leaky shear wave arrivals increases (as described above). It will be appreciated that in general, as tool eccentricity increases (and standoff decreases), the likelihood of detecting leaky shear wave arrivals also tends to increase. Thus, exemplary embodiments of this invention may be advantageously utilized to accurately determine shear wave velocities in acoustically slow formation when an LWD tool is eccentered in the borehole. Exemplary embodiments of this invention may also be utilized to check the accuracy of prior art estimation techniques.

With continued reference to FIG. 3, embodiments of this invention may utilize substantially any type of acoustic transmitter configured to generate substantially any acoustic waveform. However, in certain advantageous embodiments of this invention, the transmitter generates multi-pole acoustic waveforms. Where used herein, the term "multi-pole" refers to an acoustic signal including multiple azimuthal orders (i.e., multiple harmonics), in which no particular preselected azimuthal order (or combination thereof) has been designated for processing. For example, an acoustic signal including both monopole (zeroeth order) and dipole (first order) components is considered a multi-pole signal as the term is used herein. Likewise, an acoustic signal including monopole, dipole, and quadrupole (second order) is also considered a multi-pole signal. In theory, a multi-pole transmitter excites acoustic signals of all orders ($v=0, 1, 2, 3, \ldots n$). However, in practice, received multi-pole signals tend to be dominated by the lower order components ($v=0, 1$ or $v=0, 1, 2$), since the amplitude of the higher order signals tends to be approximately proportional to $1/v^2$.

The use of multi-pole acoustic signals advantageously obviates the need to generate acoustic signals having a substantially pure or a "pseudo" azimuthal order, for example, substantially pure or pseudo dipole waves or substantially pure or pseudo quadrupole waves as utilized in the prior art. As described above, the utilization of acoustic signals having a substantially pure or pseudo azimuthal order typically requires transmitters and receivers having significantly increased complexity (and therefore cost). Rather, it will be appreciated that pursuant to this invention, it is not necessary to isolate, suppress or enhance any particular azimuthal (harmonic) modes in either transmission or reception of the acoustic energy (waveforms). The waveform may be taken as it is received. For example, activities such as filtering, interference, or adding or subtracting of various waveforms from one transmitter or receiver with that of another, are not required. Likewise, it is not necessary to deploy transmitters or receivers having a particular geometry, or to ordain the timing of various components to transmit or receive substantially pure or pseudo monopole, dipole, or quadrupole waveforms. Thus, exemplary methods of this invention may enable acoustic logging tools having relatively simple, inexpensive transmitters and receivers to be utilized.

While acoustic signals may be utilized having substantially any frequency band, it is generally desirable to utilize a frequency band that is high enough to avoid drilling noise and low enough to provide sufficient amplitude of leaky shear waves. In one exemplary embodiment of this invention, the transmitter advantageously emits acoustic energy having a center frequency in the range of from about 5 to about 9 kHz. Advantageous embodiments of this invention may also utilize a narrow band acoustic generator (transmitter). For example, in various exemplary embodiments, the transmitter may have a bandwidth of less than about 50% of its center frequency value (e.g., less than about 3 kHz). In other exemplary embodiments, the transmitter may have a bandwidth less than about 20% of its center frequency (e.g., less than about 1.2 kHz). The use of a narrowband acoustic frequency advantageously maximizes the energy of the acoustic signal in the frequency range of interest, thereby increasing the signal to noise ratio and reducing electrical power requirements (which tends to be a significant advantage in LWD applications).

The acoustic signal may be received using substantially any suitable acoustic receiver. In general only a single receiver is required. However, advantageous embodiments typically utilize a receiver array including a plurality of longitudinally spaced receivers (e.g., as shown in FIG. 2 in which four receivers 140 are longitudinally spaced along the tool body 110). Such receiver arrays advantageously provide significant additional information about the acoustic signal as it traverses the borehole. The received acoustic signal may also be filtered, e.g., with a pass band filter having a center frequency in the range of from about 6 to about 8 kHz and a bandwidth of less than about 1.2 kHz.

Turning now to FIG. 4, a flowchart 300 of another method of this invention is illustrated. At 302 a first acoustic signal is transmitted into the borehole using a first transmitter (e.g., transmitter 130 in FIG. 2). The first transmitter advantageously emits a narrowband acoustic signal having a center frequency in the range from about 12 to about 16 kHz. The first acoustic signal is then received 304 at a receiver array including a plurality of longitudinally spaced receivers (e.g., receivers 140 in FIG. 2). The received waveforms may then be utilized to determine a formation compressional wave velocity at 306, for example using known semblance and/or phase velocity techniques.

At 308 a second acoustic signal is transmitted from a second acoustic transmitter (e.g., transmitter 120 in FIG. 2). Waveforms from the second acoustic signal are then received at 310 at the receiver array (e.g., as shown in FIG. 2). At 312, a standoff distance between the receivers and the borehole wall is measured, for example, by one of the receivers as described above. The received waveforms may then be examined at 314 to determine if the formation is acoustically fast or slow. If the formation is acoustically fast (i.e., includes shear arrivals), then a formation shear wave velocity is determined at 316, for example, using known semblance or phase velocity techniques. If the formation is acoustically slow, the measured standoff distance is utilized to determine whether or not the received waveform includes a leaky shear arrival at 318. For example, as described above, the presence of leaky shear waves in the waveform is indicated when the standoff distance is less than a predetermined threshold and the formation shear velocity may be directly determined as described above at 316. If there are no leaky shear arrivals in the received waveform, then a borehole guided wave velocity may be determined from the borehole guided wave arrivals at 320. A formation shear velocity may then be estimated at 322 from the borehole guided wave velocity determined at 320 by one or more known dispersion correction algorithms.

It is well known that dispersion correction algorithms require knowledge of numerous borehole and formation properties. Such properties include, for example, the frequency of the transmitted waveform, the density and compressional wave velocity of the drilling fluid, the local density and compressional velocity of the formation being drilled, the local borehole diameter, and the harmonic modes of the borehole guided waves. Such properties may be determined via substantially any suitable known techniques.

The frequency of the acoustic energy may simply be taken, for example, as the center frequency of the acoustic transmitter (e.g., in the range of from about 5 to about 9 kHz in exemplary embodiments of this invention). In various exemplary embodiments a pass band filter may be applied to the received waveforms. In such embodiments, the center frequency of the pass band filter may be used. Alternatively, the frequency may be estimated by computing an instantaneous frequency of the received waveforms and averaging the instantaneous frequency over the portion of the waveform including borehole guided wave arrivals.

The density of the drilling fluid may be determined from direct surface measurements. Such measured values may be suitable for many applications. More accurate estimates may be obtained by correcting the surface measured values using downhole pressure and/or temperature measurements and known empirical or theoretical correlations.

The compressional wave velocity of the drilling fluid is typically dependent upon temperature, pressure, and drilling fluid composition. As such it may, for example, be computed based on downhole temperature and/or pressure measurements. Alternatively it may be estimated by determining formation shear wave velocities in acoustically fast regions of the borehole. Minimum values of the formation shear wave velocities (as determined in acoustically fast regions of the borehole) may be estimated to be equal to a compressional wave velocity of the drilling fluid.

The formation compressional wave velocity may be determined from the compression wave arrival in the received waveforms or from other acoustic measurements, for example, as shown at 306 in FIG. 4.

The density of the formation being drilled and the local diameter of the borehole may preferably be measured using LWD measurement tools, such as spectral density measurement and acoustic caliper tools, respectively. For example, both density and diameter may be determined using the Density Neutron Standoff Caliper Multilink (DNSCM™) tool available from Pathfinder Energy Services. Alternatively, if direct formation density measurements are not available, the formation density may be estimated from the formation compressional wave velocity using known correlative relationships such as the Gardener equations. In the absence of caliper measurements, the borehole diameter may alternatively be assumed to be equal to the diameter of the drill bit plus some allowance for borehole washout.

In the above embodiments, the transmitter(s) are fired and the received waveform(s) are typically recorded regardless of the measured standoff distance. It will be appreciated that in alternative embodiments the transmitter may be fired only when the measured standoff distance (preferably at the receiver(s)) is less than a threshold value. Such an alternative embodiment advantageously reduces (minimizes) the number of transmitter firings and increases the power efficiency of the downhole tool. Such and embodiment also reduces the rate of data acquisition, thereby enabling the device to acquire data for a longer period of time before its memory banks are filled. A somewhat less efficient alternative would be to fire the transmitters independent of the standoff measurement but only record the waveforms when the measured standoff distance is below a threshold value.

Although the present invention and its advantages have been described in detail, it should be understood that various changes, substitutions and alternations can be made herein without departing from the spirit and scope of the invention as defined by the appended claims.

I claim:

1. A method for determining a shear wave velocity of a subterranean formation, the method comprising:
    (a) deploying a downhole tool in a borehole, the downhole tool including at least one acoustic transmitter located at a first longitudinal position in the borehole and at least one acoustic receiver located at a second longitudinal position in the borehole;
    (b) propagating an audible acoustic signal in the borehole using the acoustic transmitter;
    (c) simultaneously (i) receiving an audible acoustic waveform from the acoustic signal and (ii) measuring an ultrasonic standoff distance between an outer surface of the downhole tool and the subterranean formation at at least one of the acoustic receiver(s);
    (d) evaluating the standoff distance measured in (c) to indicate a presence of leaky shear wave arrivals in the waveform simultaneously received in (c); and
    (e) processing the leaky shear wave arrivals to determine the shear wave velocity of the subterranean formation when the standoff distance evaluated in (d) indicates the presence of leaky shear wave arrivals.

2. The method of claim 1, wherein the processing in (c) comprises utilizing an algorithm selected from the group consisting of a semblance algorithm and a phase velocity algorithm.

3. The method of claim 1, wherein (d) comprises comparing the standoff distance measured in (d) with a predetermined standoff threshold.

4. The method of claim 3, wherein:
    a measured standoff distance less than the predetermined threshold indicates the presence of a leaky shear wave arrival in the received waveform; and
    a measured standoff distance greater than the predetermined threshold indicates an absence of a leaky shear wave arrival in the received waveform.

5. The method of claim 1, further comprising:
    (f) processing the waveform received in (c) to determine a borehole guided wave velocity when the standoff distance simultaneously measured in (c) indicates an absence of a leaky shear arrival; and
    (g) processing the borehole guided wave velocity to estimate the shear wave velocity of the subterranean formation.

6. The method of claim 5, wherein (g) comprises:
    processing a mathematical model to relate a theoretical shear wave velocity to a theoretical borehole guided wave velocity; and
    processing the mathematical model and the borehole guided wave velocity determined in (f) to estimate the shear wave velocity of the subterranean formation.

7. The method of claim 6, wherein the mathematical model is dependent on at least one parameter selected from the group consisting of
    (1) a frequency of the multi-pole acoustic signal;
    (2) a density of the subterranean formation;
    (3) a density of a drilling fluid;
    (4) a compressional wave velocity of the subterranean formation;
    (5) a compressional wave velocity of the drilling fluid; and
    (6) a diameter of the borehole.

8. The method of claim 1, wherein:
    the acoustic signal has a center frequency in a range of about 5 kHz to about 9kHz; and
    the acoustic signal has a bandwidth less than about 3 kHz.

9. The method of claim 1, further comprising:
    (f) filtering the acoustic waveform received in (c) with a pass band filter, the pass band filter having a center frequency in a range from about 6 kHz to about 8 kHz and a bandwidth less than about 1.2 kHz.

10. A method for determining a shear wave velocity of a subterranean formation, the method comprising:
    (a) deploying a logging while drilling tool in a borehole, the logging while drilling tool including at least one acoustic transmitter located at a first longitudinal position in the borehole and at least one acoustic receiver located at a second longitudinal position in the borehole;
    (b) propagating an audible acoustic signal in the borehole using the acoustic transmitter;
    (c) simultaneously (i) receiving an audible acoustic waveform from the acoustic signal and (ii) measuring an ultrasonic standoff distance between an outer surface of the downhole tool and the subterranean formation at at least one of the acoustic receiver(s);
    (d) processing a leaky shear wave arrival in the acoustic waveform received in (c) to determine the shear wave velocity of the subterranean formation when the standoff distance simultaneously measured in (c) is less than a predetermined threshold standoff; or processing a borehole guided wave arrival in the acoustic waveform received in (c) to determine the shear wave velocity of the subterranean formation when the standoff distance simultaneously measured in (c) is greater than the predetermined threshold standoff.

11. The method of claim 10, wherein the processing in (d) comprises utilizing an algorithm selected from the group consisting of a semblance algorithm and a phase velocity algorithm.

12. The method of claim 10, wherein (d) further comprises:
    processing the waveform received in (c) to determine a borehole guided wave velocity;
    processing a mathematical model to relate a theoretical shear wave velocity to a theoretical borehole guided wave velocity; and
    processing the mathematical model and the borehole guided wave velocity to estimate the shear wave velocity or the subterranean formation.

13. The method of claim 10, wherein the acoustic signal is a multi-pole acoustic signal having a center frequency in a range of about 5 kHz to about 9 kHz and a bandwidth less than about 3 kHz.

14. A method for determining compressional wave and shear wave velocities of a subterranean formation, the method comprising:
    (a) deploying a logging while drilling tool in a borehole, the logging while drilling tool including first and second transmitters and a receiver array having a plurality of receivers longitudinally spaced from the transmitters;

(b) propagating an audible first acoustic signal in the borehole using the first transmitter;

(c) receiving a first set of waveforms from the first acoustic signal at the receiver array;

(d) processing the first set of waveforms to determine the compressional wave velocity of the subterranean formation;

(e) propagating an audible second acoustic signal in the borehole using the second acoustic transmitter;

(f) simultaneously (i) receiving a second set of waveforms from the second acoustic signal and (ii) measuring an ultrasonic standoff distance between an outer surface of the logging while drilling tool and the subterranean formation at at least one of the receivers in the receiver array;

(g) processing a leaky shear wave arrival in the second set of waveforms received in (f) to determine the shear wave velocity of the subterranean formation when the standoff distance simultaneously measured in (f) is less than a predetermined threshold standoff, or processing a borehole guided wave arrival in the second set of waveforms received in (f) and the compressional wave velocity determined in (d) to determine the shear wave velocity of the subterranean formation when the standoff distance simultaneously measured in (f) is greater than the predetermined threshold standoff.

15. The method of claim 14, wherein the first acoustic signal has a center frequency in a range from about 12 kHz to about 16 kHz.

16. The method of claim 14, wherein the second acoustic signal has a center frequency in a range from about 5 kHz to about 9 kHz and a bandwidth less than about 3 kHz.

17. The method of claim 14, wherein the processing in (g) comprises utilizing an algorithm selected from the group consisting of a semblance algorithm and a phase velocity algorithm.

18. The method of claim 14, wherein (g) further comprises:
processing the waveform received in (f) to determine a borehole guided wave velocity;
processing a mathematical model to relate a theoretical shear wave velocity to a theoretical borehole guided wave velocity; and
processing the mathematical model and the borehole guided wave velocity to estimate the shear wave velocity of the subterranean formation.

* * * * *